(Model.)
G. H. CORLISS.
GOVERNOR FOR STEAM ENGINES.
No. 262,209. Patented Aug. 8, 1882.
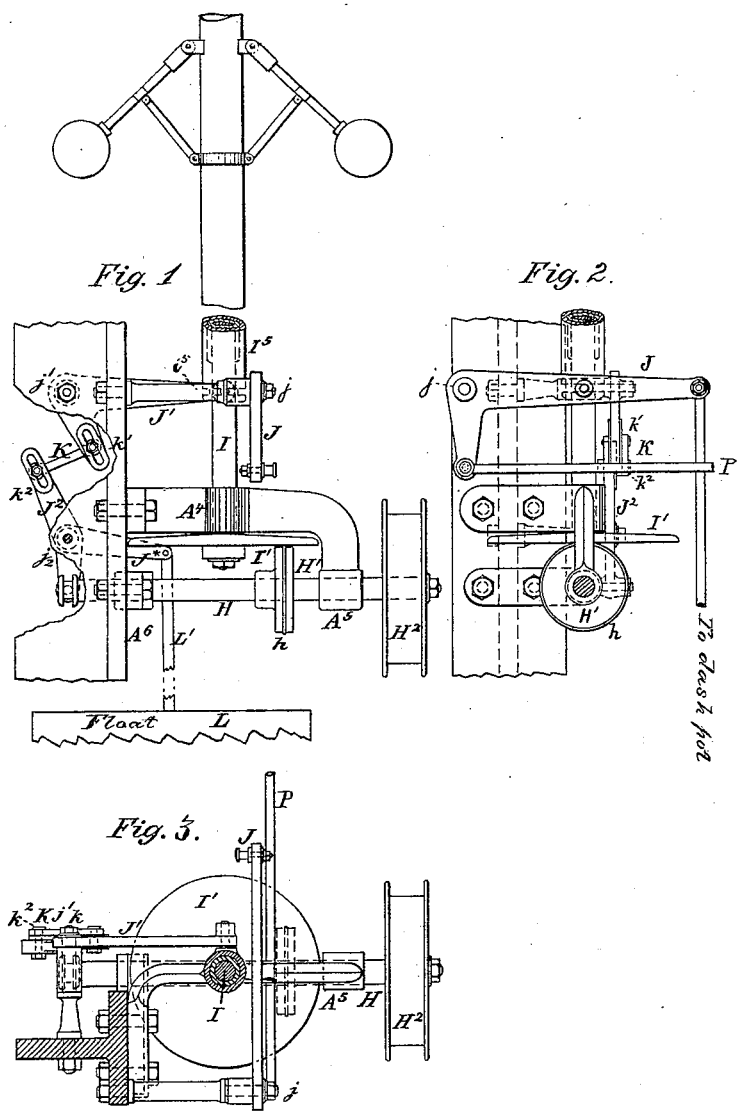

UNITED STATES PATENT OFFICE.

GEORGE H. CORLISS, OF PROVIDENCE, RHODE ISLAND.

GOVERNOR FOR STEAM-ENGINES.

SPECIFICATION forming part of Letters Patent No. 262,209, dated August 8, 1882.

Application filed June 14, 1880. Renewed January 23, 1882. (Model.)

*To all whom it may concern:*

Be it known that I, GEORGE HENRY CORLISS, a citizen of the United States, residing at Providence, in the county of Providence and State of Rhode Island, have invented certain new and useful Improvements Relating to Governors for Steam-Engines and other Motors, of which the following is a specification.

The object is to avoid the differences of speed which ordinarily obtain when the engine is running light or running heavily loaded.

I will describe the improvements as applied to a fly-ball governor.

Ordinarily it requires a considerably higher speed to run the balls at a high level and cut off the steam at an early point than to run with the balls at a low level and "follow" long. In other words, a high tension of the steam or light load on the engine, being met by the governor-balls rising to a high position, and thus reducing the quantity of steam, compels the engine to run with a considerably higher velocity than when the steam-pressure is low or the load is heavy, requiring the measure of steam to be increased.

Devices have before been proposed for changing the relative speed of the engine and governor at will. I have discovered that it is practicable to make such a change automatically by the action of the governor itself, and to so proportion the parts that the change in the relations of these speeds shall exactly compensate for the required high speed of the governor to reduce the quantity of steam used.

My governor requires an excess of velocity in the engine to raise the balls of the governor and a reduction in the speed of the engine to lower the balls of the governor; but as soon as the balls have actually raised, or lowered my device impresses a corresponding change of velocity ratio between the motion of the engine and the governor, so that while the governor maintains the higher or lower velocity the engine runs at the same ratio as before. This is a very important point. The engine, which has slightly quickened its speed and raised the balls, is, by the change in the relation of the parts, brought again to its proper speed, but without the balls necessarily returning to their original position. They remain in the new position by reason of the governor running faster, while the engine runs no faster than before. If the next change in the velocity chances to be a slowing of the engine, the reverse action takes place; but if it is in the same direction the governor-balls fly higher yet, and again, by reason of the peculiar combination, the engine comes to its original speed without the balls returning. These changes may go on in the same direction until the limit of motion is reached; but I take care that the range is sufficiently ample, so that this shall not occur until I have reached the minimum and maximum power of which the engine or other motor is susceptible.

The accompanying drawings form a part of this specification, and represent what I consider the best means of carrying out the invention.

Figure 1 is a side elevation of the lower portion of my governor. A portion of the frame is broken away to better show the mechanism. Fig. 2 is an elevation at right angles thereto. Fig. 3 is a plan view of the same parts.

Similar letters of reference indicate like parts in all the figures.

The drawings represent the novel parts, with so much of the ordinary parts as is necessary to indicate their relations thereto.

Referring to the figures, A is the fixed framework of a steam-engine or other motor. (Not shown.) A' is the lower bearing of an upright shaft, I, which is equipped at the top with the ordinary heavy fly-balls, $I^3$, and links, which connect to a sleeve, $I^5$, which revolves with the shaft I, being driven by a feather on the latter, (not shown,) and is capable of rising and sinking thereon, as controlled by the position of the fly-balls. These parts may be of any ordinary or suitable construction.

On the bottom of the shaft I is truly set a large disk, I', having a plane and smooth under surface, through which the motion is received by friction for inducing the rotary motion of the governor.

$A^5$ $A^6$ are fixed bearings, supported by the framing. H is a shaft driven by the belt from the engine running on the pulley $H^2$, so that its rate of rotation corresponds accurately therewith. The shaft H is supported in the bearings $A^5$ $A^6$, and is capable of being moved axially. It carries a rigidly-mounted wheel, H', which is divided to form clamps, between which are confined a series of disks, $h$, of stout paper or pasteboard, the edges of which project beyond the outer face of the wheel H', and are turned to afford a smooth and uniformly-adhesive contact with the plane under face of the disk I'. Any shifting of the shaft H endwise changes the distance of the point of contact of the wheel H' with the disk I', and correspondingly changes the rate of rotation of the shaft I relatively to that of the engine, which I will term the "velocity ratio."

The sleeve $I^5$ is moved upward and downward by the rising and falling of fly-balls, which may be of any ordinary form and proportion. The rising of the balls as the speed of the governor increases and the sinking thereof as the speed decreases induce the ordinary effect by causing a corresponding change of level of the sleeve $I^5$, and the corresponding turning of the bell-crank lever J, which turns on a fixed center, $j$, and, by changing the position of the horizontal rod connected thereto, changes the point of cut-off of the engine, or operates a throttle-valve or the gate-controlling mechanism of a water-wheel by well-known devices.

J' is a lever turning on a fixed center, $j'$, and engaging by one of its arms in the groove $i^5$ by means of a short pin, as shown. The rising of the balls not only lifts the sleeve $I^5$, and thus by its groove $i^5$ changes the position of the lever J, and by means of the rod P changes the point of cut-off of the engine by well-known means, (not represented,) but it also turns the lever J'. The lower arm of the lever J' is connected by a link, K, to a lever, $J^2$, which turns on a fixed center, $j^2$, and engages by its lower arm in a groove turned in the shaft H. The proportions are such that when the speed of the engine is increased and the rotation of the shaft H is performed in less time it imparts its quickened rotation to affect the fly-balls $I^3$, causing them to rise, and this rise not only changes the position of the rod by the action of the lever, but also, through the lever J' and its connections, moves the driving-shaft H endwise, so as to cause it to act in a smaller circle on the under face of the disk I'. This acting nearer the center of the circle induces a quicker motion of rotation in the balls. This quickened motion maintains the balls $I^3$ at their increased elevation without necessitating the continuance of the increased speed of the engine; and so soon as the velocity of the engine has appreciably decreased, so as to lower the sleeve $I^5$, that fact not only induces the ordinary change of the point of cut-off by the action of the lever J, but also changes the point of contact of the wheel H' by the action of the lever J and its connections.

It will now be seen that when the engine is running at its ordinary rate a diminishing of the speed of the governor does not simply lower the balls and sleeve $I^5$, so as to modify the point of cut-off by the action of the lever J, but also by the action of the lever J'. Link K and lever $J^2$ move the shaft H endwise to the left, changing the bearing-point of the wheel H' $h$ to a position farther out from the center of the disk I'. This causes the governor to run slower relatively to the engine, and thus induces the required change in the position of the cut-off. When, on the contrary, the speed of the engine becomes materially too high and raises the balls it not only causes the proper change of position of the lever J and the required changes of position of the cut-off devices (not represented) connected thereto, but also, through the connections J' K $J^2$, moves the shaft H so as to bring the bearing-point of the wheel H' $h$ closer to the center of the disk I', and increases the velocity ratio of the governor. Such a change in the velocity of the governor relatively to that of the engine causes the changes in the actual speed of the engine to impress greater changes in the actual speed of the governor. These changes in the speed of the governor enable it to perform its functions powerfully and reliably, and to easily effect the required changes in the position of the lever J and its connections, and consequently in the point of cut-off or in the position of the throttle-gate or other device for controlling the power. (Not represented.)

The adjustment of the velocity ratio is important. If the rise of the governor-balls when the engine quickens its speed induces too little change in the axial position of the shaft H, the improved device will work too much like the ordinary governor, and require a permanent increase in the speed of the engine to induce the consumption of less steam or water. If, on the contrary, the shaft H moves endwise too much, in consequence of any given increase or diminution of motion of the engine, the said increase or diminution will go on increasing, and the governor cannot perform its functions. In this latter case the motion of the engine will be in "unstable equilibrium." Any change of speed in either direction will be automatically increased, instead of diminished, by the action of the governor; but, with the adjustment exactly right, the change of speed will be simply met or balanced by the change in the velocity ratio, and the governor will control the engine and bring it to the proper velocity without, on the one hand, continuing the motion of the balls upward or downward, or, on the other hand, requiring them to return to their original positions.

My levers J' and $J^2$, as connected by the movable link K, allow such adjustment with great delicacy. The lower arm of the lever J' and the upper arm of the lever $J^2$ are inclined and slotted. The link K connects pins which are capable of being changed in these slots to as small extents as may be desired. I can mount micrometer-screws to aid in this adjustment, if desired. I propose in ordinary cases to employ shouldered pins $k'$ $k^2$, which may be firmly set in any desired position in the respective slots.

I have in my experiments used the proportions indicated in the drawings. While the ordinary governor requires a velocity much above the normal to hold the fly-balls in their highest position, and to give the engine the minimum steam and a velocity much lower than the normal to run the fly-balls in their lowest position and to give the engine the maximum steam, the improved governor holds the engine at a uniform speed, or so nearly so that no appreciable difference is observed in counting the strokes for a minute or more with the governor-balls in their highest, lowest, and in several intermediate positions.

Modifications may be made in the form of the devices H' h and the disk I'. The latter need not be a plane surface. It may be swelled or hollowed. It may be a full cone or a hollow cone, care being taken to run the shaft H in a proper relation thereto, so that the contact shall be maintained as the shaft H is moved endwise in its bearings.

I prefer the form of details shown. I esteem the paper h a peculiarly well adapted material for transmitting the motion with the twisting friction to which it is subjected.

The wear at the point of contact of the paper h with the under surface of the disk I' rapidly smooths both surfaces.

Additional lines in Fig. 1 show a mode of working by means of the same governor differently connected, which is very important in some situations. In pumping sewage from a large pit—for example, to facilitate the drainage of a city—it is of importance to regulate the speed of the engine so that it shall neither stop nor go too fast, and also to vary the rate of speed according to the quantity of water received from the sewers under different conditions. In a heavy rain the sewer, even if provided with all the approved means of taking away such water by lateral passages, termed "intercepting sewers," will still deliver much more than usual into the pit. In a dry spell, at night, or on a Sunday, when work-shops are disused the quantity of liquid to be pumped from the sewer-pit is much less. For such uses my governor is made to vary its speed relatively to that of the engine, not automatically, as shown by the strong lines, but according to the height of the water in the pit, as indicated by a float. The link K is disconnected, and the arm J*, which has before been idle, is now made available by engaging it with the rod L', attached to the float L in the pit. Thus conditioned, a rise of the water will, by raising the float L, shift the pulley H' h outward under the disk I', and cause the governor to turn slower relatively to the engine, thus lowering the balls I³ and calling for more steam. The reverse action occurs when the water in the pit is lowered. With each change the governor will so supply steam to the engine that the engine will run enough faster or slower to cause the governor to maintain nearly its usual speed. This method of adjusting the wheel H' h by the float L will be made the subject of a separate application for patent.

I claim as my invention—

1. In combination with the sleeve I⁵, moved automatically as the speed of the engine changes, the driving-shaft H and wheel H' h with a train of connections communicating an endwise motion thereto according to the changes of I⁵, and with a disk or wheel, I', and shaft I, communicating motion to the governor at variable velocities, substantially as herein specified.

2. In combination with means I' H' J' J² for automatically changing the velocity ratio of the governor with changes in the velocity of the engine, the adjusting means k' k² and link K, adapted to change the motions of the parts relatively to each other, as herein specified.

3. In a steam-engine, the combination, with the governor, of a device, H', adjusted automatically by the governor, or so as to vary the velocity of the governor relatively to the engine as the speed increases and diminishes and hold the speed of the engine the same under different loads, as herein specified.

4. In a steam engine or analogous motor, the device H', adjustable to vary the velocity of the governor relatively to the engine, in combination with two independent means, K and L, for adjusting the same, one controlling it by the changes in the speed and the other controlling it by the changes of level of a float, as herein specified.

In testimony whereof I have hereunto set my hand, at Providence, Rhode Island, this 9th day of June, 1880, in the presence of two subscribing witnesses.

GEO. H. CORLISS.

Witnesses:
 EDGAR PENNEY,
 ED. W. RAYNSFORD.